United States Patent [19]
Nakatani

[11] Patent Number: 5,481,411
[45] Date of Patent: Jan. 2, 1996

[54] TAPE DUBBING AND DIVIDED MASTER TAPE PRODUCING SYSTEM

[75] Inventor: Yoichiro Nakatani, Mito, Japan

[73] Assignee: Victor Company of Japan, Ltd., Yokohama, Japan

[21] Appl. No.: 396,454

[22] Filed: Feb. 28, 1995

Related U.S. Application Data

[63] Continuation of Ser. No. 116,948, Sep. 3, 1993, abandoned, which is a continuation of Ser. No. 930,819, Aug. 14, 1992, abandoned.

[51] Int. Cl.[6] .................................................. H04N 5/782
[52] U.S. Cl. .............................. 358/311; 360/15; 360/23; 358/335
[58] Field of Search ............................ 360/15, 22, 23, 360/24; 369/84, 85; 358/310, 335, 342, 311

[56] References Cited

U.S. PATENT DOCUMENTS

| | | | |
|---|---|---|---|
| 2,923,773 | 2/1960 | Reynolds | 360/23 |
| 4,141,045 | 2/1979 | Sheehan | 360/15 |
| 4,355,338 | 10/1982 | Yamamoto et al. | 360/15 |
| 4,410,917 | 10/1983 | Newdoll et al. | |
| 4,750,050 | 6/1988 | Belmares-Salabia et al. | 358/311 |
| 4,899,230 | 2/1990 | Sherritt | 360/15 |
| 5,420,690 | 5/1995 | Koisai | 358/342 |

FOREIGN PATENT DOCUMENTS

| | | |
|---|---|---|
| 0016560 | 10/1980 | European Pat. Off. . |
| 0261826 | 3/1988 | European Pat. Off. . |
| 0312406 | 4/1989 | European Pat. Off. . |
| 0475689 | 3/1992 | European Pat. Off. . |
| 0097008 | 7/1980 | Japan .................................. 360/15 |
| 58-118009 | 7/1983 | Japan . |
| 59-213034 | 12/1984 | Japan . |
| 0001628 | 1/1985 | Japan .................................. 360/15 |
| 60-19567 | 5/1985 | Japan . |
| 0122930 | 6/1986 | Japan .................................. 360/15 |
| 61-35611 | 8/1986 | Japan . |
| 61-269228 | 11/1986 | Japan . |
| 0159630 | 3/1989 | Japan . |
| 0059630 | 3/1989 | Japan .................................. 360/15 |
| 01236429 | 9/1989 | Japan . |
| 0144966 | 6/1991 | Japan .................................. 360/15 |

OTHER PUBLICATIONS

Patent Abstracts of Japan, vol. 10, No. 76, 26 Mar. 1986 for JP 60-214-492.

*Primary Examiner*—Aristotelis Psitos
*Assistant Examiner*—James T. Wilson
*Attorney, Agent, or Firm*—Michael N. Meller

[57] ABSTRACT

A high speed dubbing apparatus for producing magnetic tapes such as video, audio or computer soft tapes, is provided. Typical form of the apparatus may comprise 2 master tape playback devices for synchronously playing back 2 divided master tapes respectively recorded with 2 divided master signals obtained by dividing time-divisionally an original master signal having an original data sequence by 2 and for outputting the 2 divided master signals, a double speed recording signal producing device for time-compressing each of the 2 divided master signals to ½ to obtain a double speed recording signal from the 2 divided master signals while restoring the original data sequence in the double speed recording signal and a recording device for recording the double speed recording signal on a slave tape running at a speed which is twice the nominal playback speed of the slave tape.

11 Claims, 9 Drawing Sheets

FIRST REPRODUCED SIGNAL

*Fig. 4(a)*

| TIME CODE 1a | 1 | 2 | 3 | 4 | 5 | 6 | 7 | 8 |
|---|---|---|---|---|---|---|---|---|
| VIDEO(1b) OR AUDIO(1c) SIGNAL | 1 C F | | 3 C F | | 5 C F | | 7 C F | |

DOUBLE SPEED RECORDING SIGNAL

*Fig. 4(b)*

| VIDEO(3a) OR AUDIO(3b) SIGNAL | | ×2 1CF | ×2 2CF | ×2 3CF | ×2 4CF | ×2 5CF | ×2 6CF |
|---|---|---|---|---|---|---|---|

SECOND REPRODUCED SIGNAL

*Fig. 4(c)*

| VIDEO(2b) OR AUDIO(2c) SIGNAL | 2 C F | | 4 C F | | 6 C F | | 8 C F | |
|---|---|---|---|---|---|---|---|---|
| TIME CODE 2a | 1 | 2 | 3 | 4 | 5 | 6 | 7 | 8 |

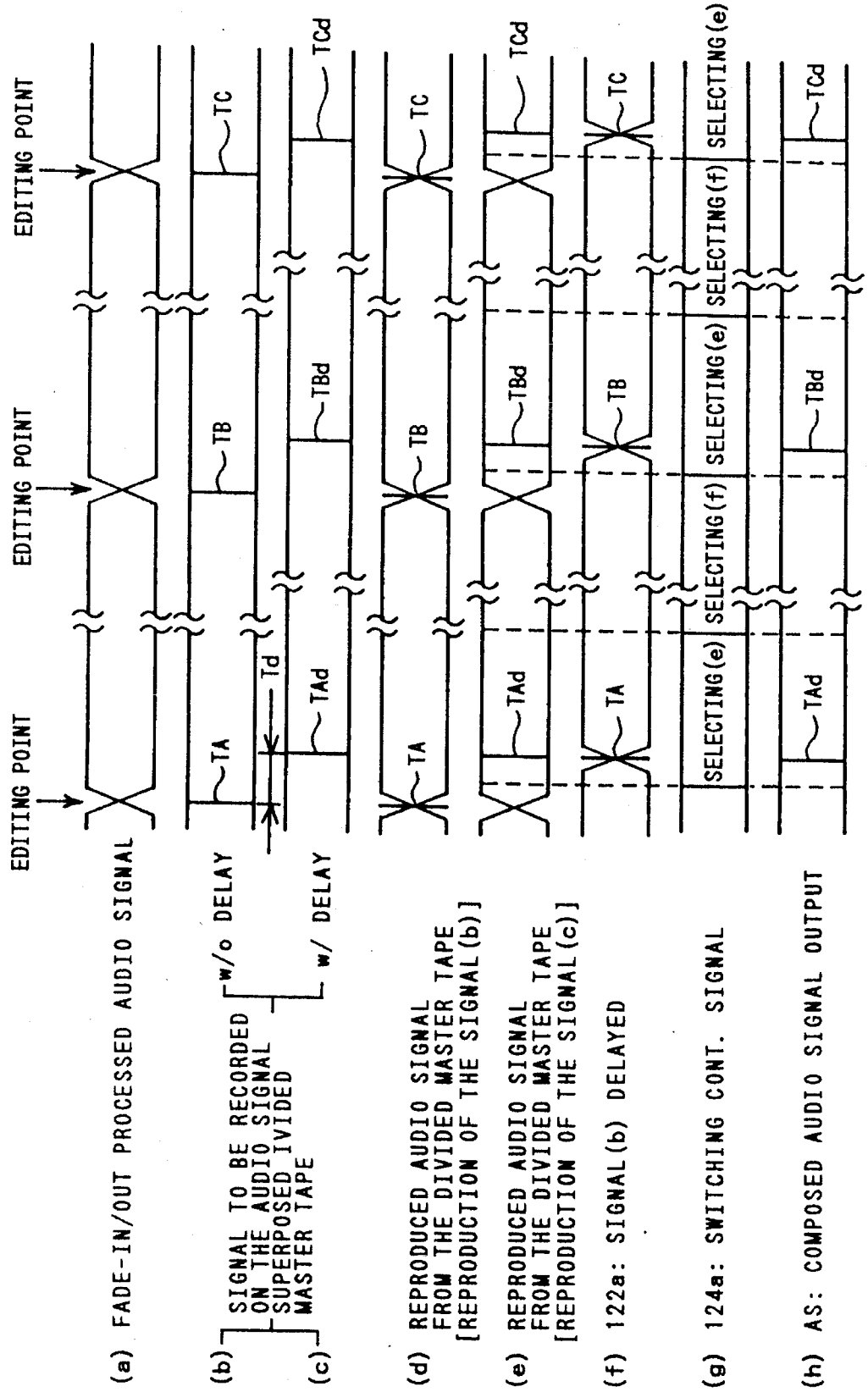

TAPE DUBBING AND DIVIDED MASTER TAPE PRODUCING SYSTEM

This application is a continuation of U.S. application Ser. No. 08/116,948, filed Sep. 3, 1993, now abandoned which is a continuation of U.S. application Ser. No. 930,819, filed Aug. 14, 1992, now abandoned.

BACKGROUND OF THE INVENTION

1. Field of the Invention

The present invention relates to an apparatus for dubbing a magnetic tape such as video soft tape, audio soft tape or computer soft tape, etc., at high speed and a device for producing a divided master tape for high speed dubbing.

In this specification, terms involving a tape speed are defined in accordance with the following definitions:

"N Speed Playback"

To playback a tape at a running speed which is N times the speed with which the tape is recorded, where N is an integer larger than 1.

"N Speed Recording"

To record a signal reproduced from a master tape played back according to the "N speed Playback" on a recording medium, or to record a signal on a tape running at a speed which is N times a nominal playback speed of that tape, where N is an integer larger than 1.

"N Speed Dubbing"

A dubbing operation in which a master tape for dubbing is played back according to the "N speed Playback" and a resultant reproduced signal thus obtained is recorded as a recording signal on a slave tape running at a speed which is N times a nominal playback speed of the slave tape, where N is an integer larger than 1.

In this case, although a transfer rate of the recording signal from a master tape playback device to a slave tape recording device is N times that of the original recording signal which is used for recording the master tape, actual running speeds of the master and slave tapes are not necessarily identical each other but they can be different each other in this "N Speed Dubbing" operation.

"Double Rate"

A status of signal transfer rate which is twice an original transfer rate (signal transfer rate used for master tape recording).

"Real Time Speed"

This represents the "N Speed Playback", the "N Speed Recording", or the "N Speed Dubbing" where N is 1, or a tape speed which is equal to its original or nominal speed.

"Double Speed"

This represents the "N Speed Playback", the "N Speed Recording", or the "N Speed Dubbing" where N is 2.

DESCRIPTION OF THE RELATED ART

A dubbing apparatus in which a signal reproduced by a master tape playback device is supplied to a plurality of slave recording devices to dub the signal on slave magnetic tapes in real time has been known.

Further, a contact print method in which a mirror image tape signal pattern is provided on a master tape having relatively large coercive force and is transferred to a slave magnetic tape by making a magnetic surface of the master tape in intimate contact with the slave magnetic tape while externally applying a low frequency magnetic field thereto has been known as a high speed dubbing system.

Since the former conventional dubbing system is of a real time dubbing system in which the slave tapes are running at their nominal playback speed and recorded with a signal obtained by playing back the master tape at its recording speed, efficiency of slave tape production is low. As to the contact print method, there are problems of degradation of signal frequency characteristics and/or S/N ratio.

The present invention is made in view of these problems and has an object to provide a high efficiency, high performance dubbing apparatus and a divided master tape producing apparatus for realizing high speed dubbing.

Besides, in a digital VTR, etc., according to D2 standard (one of the industry standards for digital video tape recording), an accompanying audio signal becomes discontinuous at a tape editing point. In order to prevent such signal discontinuity from being reproduced as noise, such audio signal is faded in at an editing start point and faded out at an editing end point, with a silence period of about 3 msec therebetween.

Therefore, when a divided master tape is produced or a produced divided master tape is played back by using such VTR, an audio signal becomes discontinuous at an editing point provided during production of the divided master tape.

The present invention is intended to solve such problems and has as an object to provide a dubbing apparatus having no discontinuity of the audio signal.

SUMMARY OF THE INVENTION

In order to solve the problems mentioned above, a dubbing apparatus according to the present invention is featured by comprising an N number of divided master tape playback devices for synchronously playing back a corresponding number of divided master tapes. These divided master tapes respectively recorded with N divided master signals obtained by dividing time-divisionally an original master signal by N. The N divided master signals as outputted. The original master signal has an original data sequence, and an N speed recording signal producing device for time-compressing each of the N divided master signals to 1/N to obtain an N speed recording signal from the N divided master signals. The original data sequence is restored in the N speed recording signal. The recording device is used for recording the N speed recording signal on a slave tape running at a speed which is N times a nominal playback speed of the slave tape.

According to another aspect of the present invention, a dubbing apparatus features each of the corresponding number of divided master tapes is recorded with a first audio signal having a predetermined delay time and a second audio signal having no. The dubbing apparatus further comprises a delay circuit for delaying the second audio signal reproduced from a corresponding one of the N number of divided master tape playback devices, and an audio signal switching circuit for switching between the first audio signal having a predetermined delay time which is reproduced from a corresponding one of the N number of divided master tape playback devices. The second audio signal delayed by the delay circuit. Making it possible to obtain an audio signal with no interruptions.

Another and specific object of the present invention is to provide a divided master tape producing apparatus comprising a master tape playback device for playing back a master tape recorded with a master signal. A signal dividing device for dividing the master signal reproduced from the master tape playback device into an N number of master signals at a predetermined time interval, and a divided master tape recording device for producing divided master tapes by recording the divided N number of master signals on a corresponding number of divided master tapes, a corresponding one of the divided master signals being arranged to be continuous on each of the divided master tapes, so that N number of divided master tapes having a continuous signal recorded thereon respectively, are produced.

The signal dividing device may further comprise a memory device for storing the N number of master signals and a supplying device for supplying the N number of master signals stored in the memory device to corresponding recording units of the divided master tape recording device. Accordingly, it is possible to prolong the time of intermittent recording operation of the divided master tape recording device and to record signals with improved stability.

According to another aspect of the present invention, a divided master tape producing apparatus is featured by comprising a master tape playback device for playing back a master tape recorded with a master signal, a signal storing/dividing device for storing temporarily the master signal reproduced from the master tape playback device and dividing the master signal stored therein into divided master signals and for reading out the divided master signals, and a divided master tape recording device for recording the divided master signals read out from the signal storing/ dividing the continuously on magnetic tapes. Accordingly, it is possible to prolong the time of intermittent recording operation of the divided master tape recording device and to record signals with improved stability.

Other objects and further features of the present invention will be apparent from the following detailed description with respect to preferred embodiments of the invention when read in conjunction with the accompanying drawings.

BRIEF DESCRIPTION OF THE DRAWINGS

FIG. 4(a), FIG. 4(b) and FIG. 4(c) shows an operation of a double speed recording signal producing device according to an embodiment of the present invention;

FIG. 10 is a series of time charts showing an operation of a playback device for playing back a delayed audio-signal-superposed divided master tape, according to the present invention.

DETAILED DESCRIPTION OF THE PREFERRED EMBODIMENTS

An embodiment of the present invention will be described with reference to the accompanying drawings.

Figure 1:
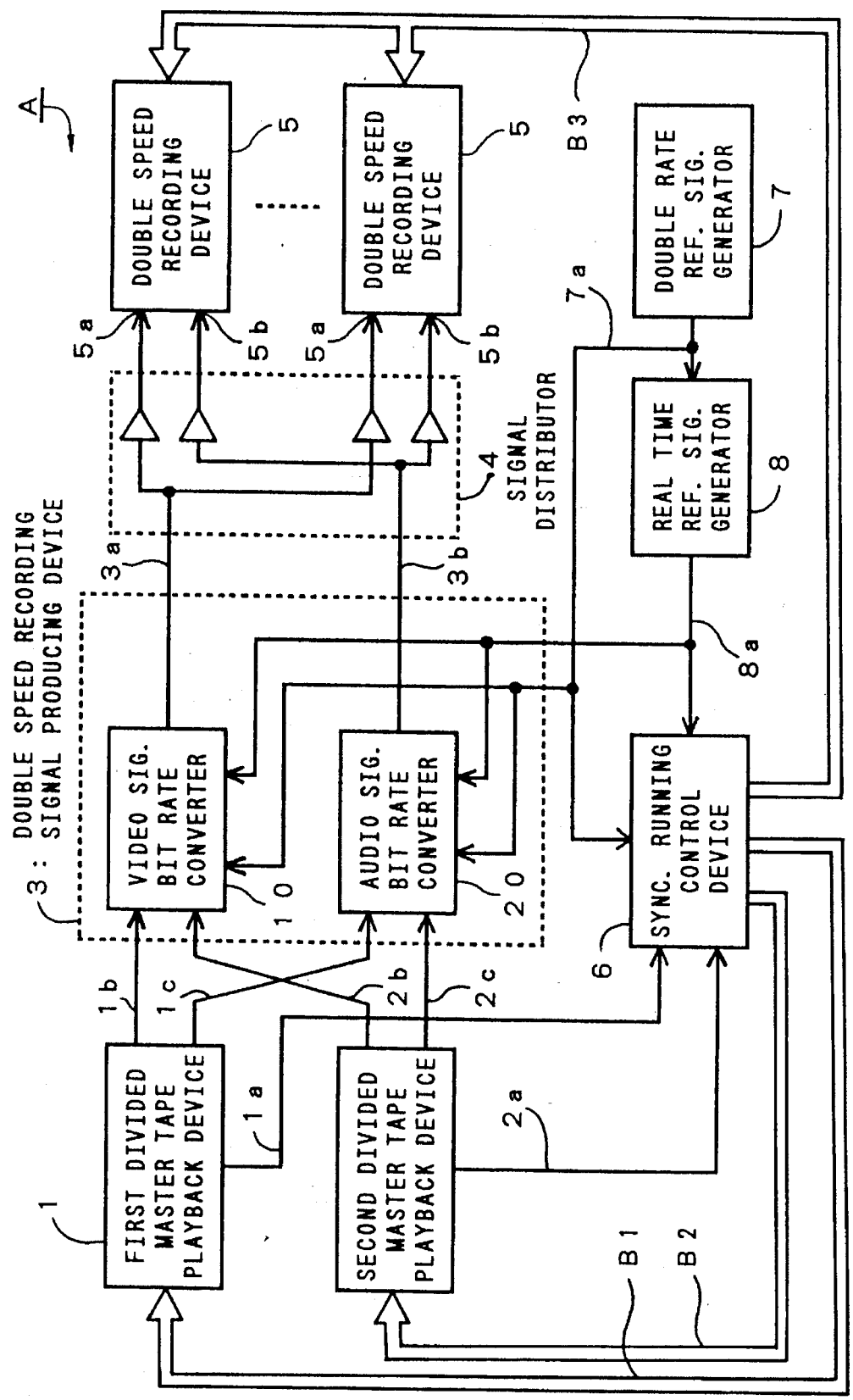
FIG. 1 is a block diagram of a double speed dubbing apparatus according to an embodiment of the present invention.

FIG. 1 is a block diagram of a double speed dubbing apparatus according to the present invention.

The double speed dubbing apparatus "A" in FIG. 1 is adapted to dub magnetic video tapes recorded with video and audio signals.

The dubbing apparatus "A" comprises first and second divided master tape playback devices 1 and 2, a double speed recording signal producing device 3, a signal distributor 4, a single or a plurality of double speed recording devices 5, a synchronous running control device 6, a double rate reference signal generator 7 and a real time reference signal generator 8.

Figure 2A:
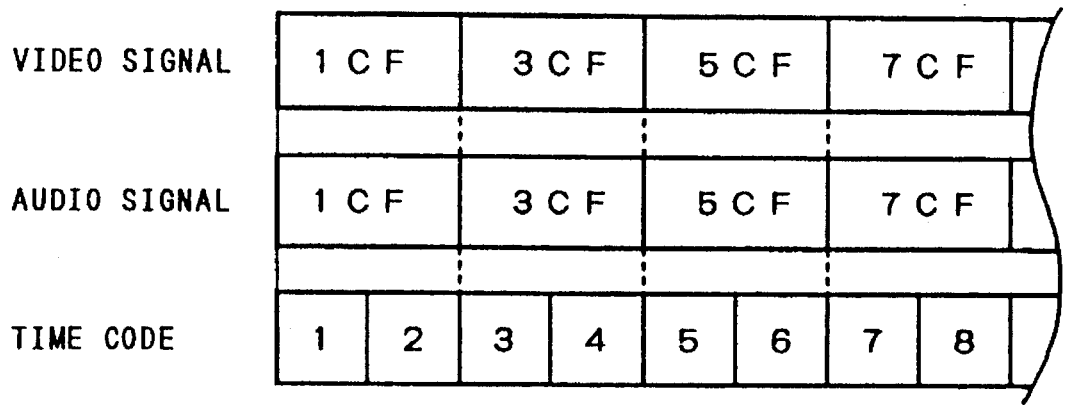
FIG. 2(a) and FIG. 2(b) illustrate a recorded content of 2 divided master tapes to be used in the apparatus in FIG. 1.
Figure 2B:
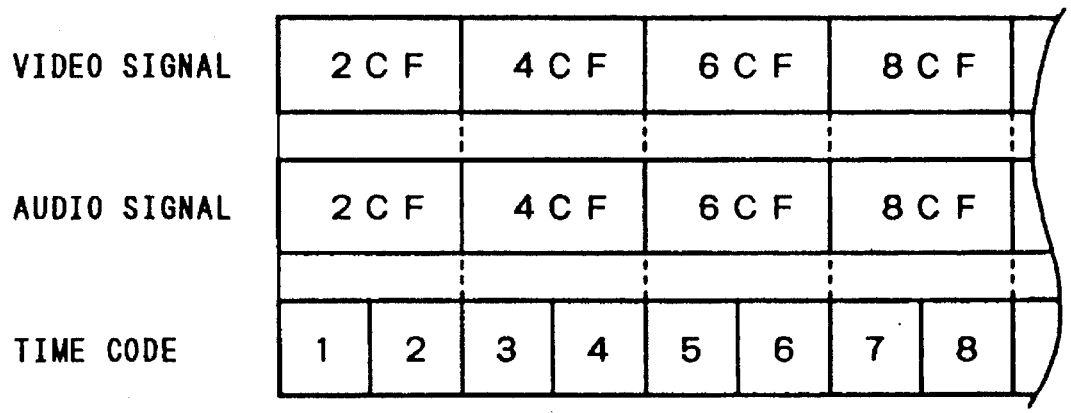

FIG. 2(a) illustrates the recorded contents of divided master tapes MA and FIG. 2(b) illustrates the recorded contents of MB.

On a first divided master tape HA shown in FIG. 2(a), a video signal and an audio signal related to odd numbered color frames (CF) are recorded together with a time code and, on a second divided master tape FIB shown in FIG. 2(b), video and audio signals related to even numbered color frames are recorded, similarly with a time code.

On each of the master tapes MA and MB, the time code is recorded as such that it increments 2 counts for every video color frame.

These divided master tapes MA and MB are played back by the first and second divided master tape playback devices 1 and 2 shown in FIG. 1, respectively.

The double rate reference signal generator 7 produces a video reference signal or a timing signal 7a at double speed, that is, at a rate twice the original recording rate.

The real time reference signal generator 8 produces a real-time timing signal 8a on the basis of the double speed timing signal 7a.

The synchronous running control device 6 supplies the real-time timing signal 8a through playback device control buses B1 and B2 to the first and second divided master tape playback devices 1 and 2, respectively, and controls these devices 1 and 2 to run synchronized together at a real time playback speed, by monitoring time code signals 1a and 2a from the first and second divided master tape playback devices 1 and 2, and sending running control information through the control buses B1 and B2 to the first and second divided master tape playback devices 1 and 2, respectively.

Further, the synchronous running control device 6 supplies the double speed timing signal 7a generated by the double rate reference signal generator 7 and running control information to the respective double speed recording devices 5 through the control bus B3 to control the double speed recording devices, so that they run at the double speed in synchronization with the playback operation of the respective master tape playback devices 1 and 2.

The double speed recording signal producing device 3 for producing a double speed recording signal comprises a bit rate converter 10 for video signal and a bit rate converter 20 for audio signal.

The video signal bit rate converter 10 responds to a real time video signal 1b reproduced (with real time speed) by the first divided master tape playback device 1 and to a real time video signal 2b reproduced by the second divided master tape playback device 2, and makes the bit rates of these video signals 1b and 2b double, respectively, and combines the respective video signals 1b and 2b into a single composed video signal 3a which is arranged in the color frame sequence.

Likewise, the audio signal bit rate converter 20 responds to audio signals 1c and 2c outputted from the respective playback devices 1 and 2 and doubles their bit rates respectively and combines them in the predetermined sequence.

When video and audio signals recorded on the divided master tapes MA and MB are digital signals, the respective bit rate converters 10 and 20 comprise temporary storage devices such as shift registers or RAMs, etc., and signal processing circuits such as read/write control devices therefor, and write the digital signals to or read them from the temporary storage devices in synchronism with the real time timing signal 8a.

FIGS. 4(a) and 4(c) show respectively time code signals 1a and 2a, video signals 1b and 2b (or audio signals 1c and 2c) which are reproduced from the first and second divided master tape playback devices 1 and 2 then inputted to the double speed recording signal producing device 3.

FIG. 4(b) shows the above video (or audio) signal being converted into a doubled bit rate, arranged in a order of color frames and outputted by the double speed recording signal producing device 3 as a composed video signal 3a (or audio signal 3b).

In a case where video and audio signals recorded on the divided master tapes MA and MB are analog signals, the respective bit rate converters 10 and 20 comprise, in addition to the components described above for digital signals, A/D converters for converting reproduced analog signals into corresponding digital signals which are stored in the temporary storage device and D/A converters for converting the digital signals having doubled bit rate read out from the temporary storage device into analog signals.

The signal distributor 4 comprises a plurality of buffer amplifiers, etc., which operate to supply double speed video signal 3a and double speed audio signal 3b outputted from the double speed recording signal producing device 3 to video signal recording input terminals 5a and audio signal recording input terminals 5b of the respective double speed recording devices 5, respectively.

Figure 3:
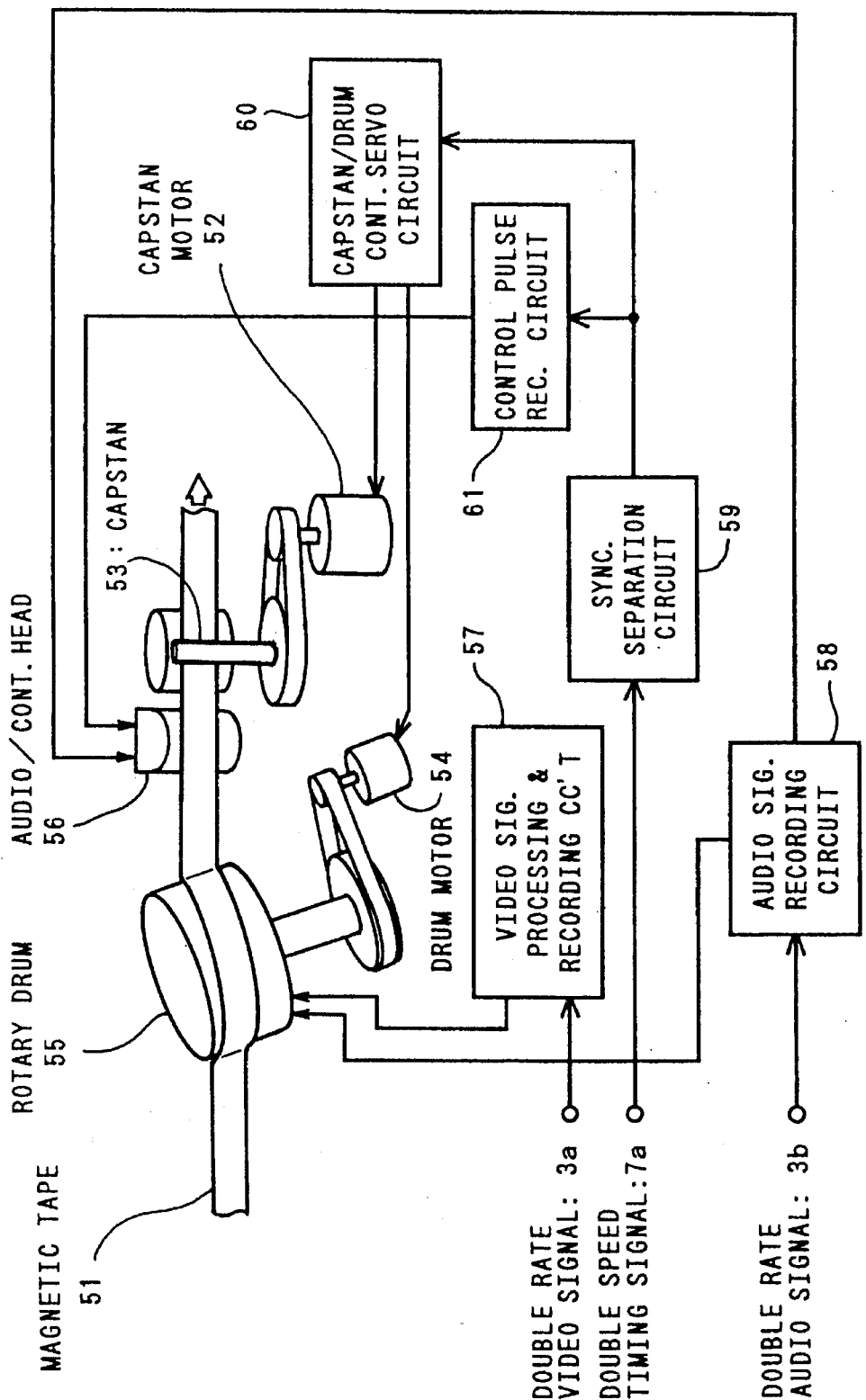
FIG. 3 is a block diagram of a double speed recording device for video tape according to an embodiment of the present invention.

FIG. 3 is a block diagram of the double speed recording device 5 for a video tape of VHS (one of the industry standard formats) system.

A magnetic tape 51 to be used as a divided master tape is transported by a capstan 53 which is driven by a capstan motor 52, and is recorded with video recording signal and audio recording signal at a double rate (doubled data transmission rate) and a control signal with respective video and audio recording heads (not shown) and a control head 56 while the magnetic tape 51 is wrapped around and passed along a rotary drum 55 driven by a drum motor 54 and is taken up on a take-up reel (not shown).

A video signal processing and recording circuit 57 derives a luminance signal and a chrominance signal from the double rate video signal 3a, frequency-modulates the luminance signal, converts the chrominance signal into lower frequency signal, combines them again and outputs a resultant mixture through a recording amplifier (not shown) to the video recording head of the rotary drum 55 to record it on the magnetic tape 51.

An audio signal recording circuit 58 frequency-modulates a left channel signal of the double rate audio signal 3b to a frequency of 1.3 MHz×2 and a right channel signal thereof to a frequency of 1.7 MHz×2, combines them and records a resultant signal on a video track portion of the magnetic tape 51 through the recording amplifier (not shown) and the FM audio signal recording head (not shown) mounted on the rotary drum 55.

In this recording system, after an FM signal related to audio signal is recorded on an under layer portion of the magnetic tape 51 in the form of under layer recording when the video signal is over-written on the same track of a surface portion of the tape after the FM audio signal is recorded.

For a longitudinal track audio signal, it is conventionally recorded on a longitudinal audio track through an audio recording amplifier (not shown) and an audio/control head 56.

The double speed timing signal (double rate video reference signal) 7a generated by the double rate reference signal generator 7 is supplied to a synch. separator circuit 59. The circuit 59 separates, from the signal 7a, a vertical synchronizing signal and outputs the latter to a capstan/drum control servo circuit 60 and a control pulse recording circuit 61.

The capstan/drum control servo circuit 60 controls the drum motor 54 and the capstan motor 52 by using the vertical synchronizing signal as a reference.

When a NTSC system video signal, is recorded at a double speed, the rotary drum 55 having a pair of heads is control led such that its rotational speed becomes 60 rps (revolution per second) when its real time speed is 30 rps and simultaneously controls the capstan 53 as such that the running speed of the magnetic tape 51 becomes 6.67 cm/sec when its real time speed is 3.335 cm/sec.

The control pulse recording circuit 61 produces a control pulse signal by wave-shaping the vertical synchronizing signal from the synch. separator circuit 59 and records it on a control track of the magnetic tape 51 through the audio/control head 56.

With the construction mentioned above, since the double speed recording signal producing device 3 produces the double speed recording signals 3a and 3b shown in FIG. 4(b) on the basis of the reproduced signals 1b, 1c, 2b and 2c which are obtained by playing the divided master tapes MA and MB in real time on the respective first and second divided master tape playback devices 1 and 2, it is possible to dub a slave tape at a double speed by recording the signals 3a and 3b in a double speed mode.

Although, in this embodiment, the original master tape is divided to two divided master tapes, it is possible to perform a dubbing at a speed 3 or more times the real time speed by increasing the dividing number of the tape up to 3 or more and converting its bit rate 3 or more times the real time bit rate.

Figure 5:
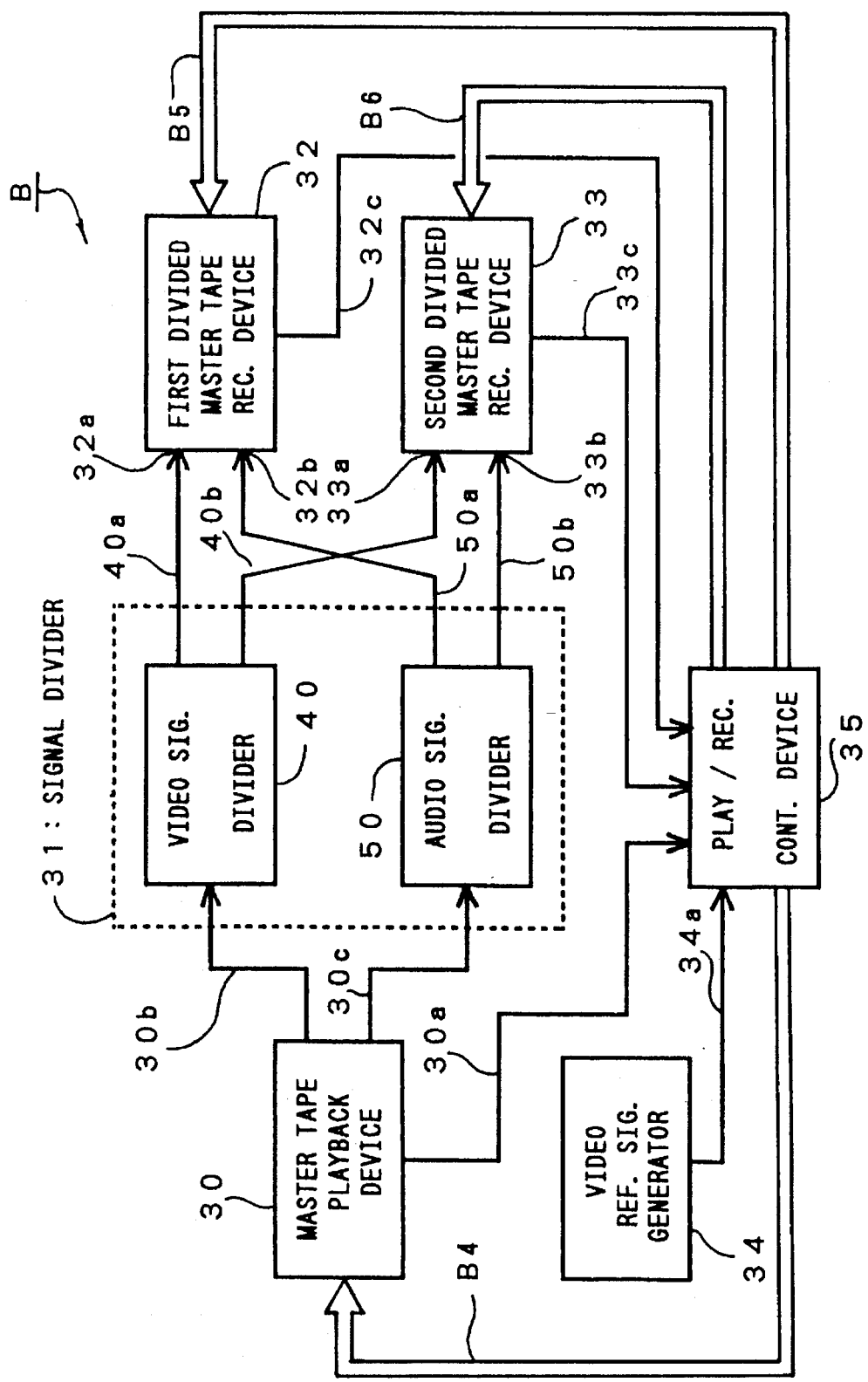
FIG. 5 is a block diagram of a divided master tape producing apparatus according to another embodiment of the present invention.

FIG. 5 is a block diagram of the divided master tape producing device according to the present invention.

The divided master tape producing apparatus "B" is adapted to produce the divided master tapes MA and MB which are respectively recorded with 2 time-divisionally divided master signals of master video and audio signals reproduced from an original master tape "M" (not shown), respectively.

In this embodiment, the divided master tapes MA and MB are produced on the basis of the original master tape having a prerecorded time code.

The divided master tape producing device "B" comprises a master tape playback device 30, a signal divider 31, a first and second divided master tape recording devices 32 and 33, a video reference signal generator 34 and a playback/recording control device 35.

The playback/recording control device 35 supplies a video reference signal 34a outputted from the video reference signal generator 34 to the master tape playback device 30 through a reproducing control bus B4 and, when the original master tape "M" loaded in the master tape playback device 30 has a prerecorded time code, the control device 35 controls the playback device 30 to play the original master tape "M" at a predetermined speed by monitoring a reproduced time code signal 30a.

Further, the playback/recording control device 35 supplies the video reference signal 34a through respective recording device control buses B5 and B6 to the respective divided master tape recording devices 32 and 33 and controls the latter such that they record the video reference signal 34a cyclically, thus time-divisionally, between the divided master tape recording devices 32 and 33.

Alternatively, the control of the first and second divided master tape recording devices 32 and 33 may be performed by using the time code signal 30a instead of the video reference signal 34a. Further, the playback/recording control device 35 may control the first and second divided master tape recording devices 32 and 33 in synchronism with each other by monitoring the time code from the master tape playback device 30 and time codes 32c and 33c reproduced from the first and second divided master tape recording devices 32 and 33.

The signal divider 31 comprises a video signal divider 40 and an audio signal divider 50.

The video signal divider 40 is adapted to output the reproduced video signal 30b from the master tape playback device 30 by switching alternately thus time-divisionally at a rate of color frame to supply a video signal 40a of odd numbered color frames to a video signal recording input terminal 32a of the first divided master tape recording device 32 and a video signal 40b of even numbered color frames to a video signal recording input terminal 33a of the second divided master tape recording device 33.

The audio signal divider 50 serves to output the reproduced audio signal 30c by switching it at the same timing as that of the video signal divider 40 as such that audio signal 50a related to the odd numbered color frame to an audio recording signal input terminal 32b of the first divided master tape recording device 32 and an audio signal 50b related to the even numbered color frames to an audio recording signal input terminal 33b of the second divided master tape recording device 33.

When the original master signal recorded on the original master tape "M" is an analog signal, the signal dividers 40 and 50 are constituted with video signal switching circuits (analog switches for video signal) etc., respectively. When the signal recorded on the original master tape "M" is a digital signal, they may be constituted as such that signal distribution is performed by logic circuits.

In the divided master tape producing device "B" constituted as mentioned above, the respective divided master tape recording devices 32 and 33 operate alternatively and intermittently in synchronism with the playback of the original master tape "M" on the master tape playback device 30 in the manner that the reproduced video signal 30b and the reproduced audio signal 30c from the original master tape "M" is distributed cyclically and time divisionally at a predetermined interval to respective divided master tape recording devices 32 and 33. Accordingly, the first and second divided master tapes MA and MB shown in FIG. 2(a) and FIG. 2(b) are produced.

Although, in this embodiment, the original master signal is divided to two divided master tapes, it is possible to divide the original master signal by 3 or more.

Figure 6:
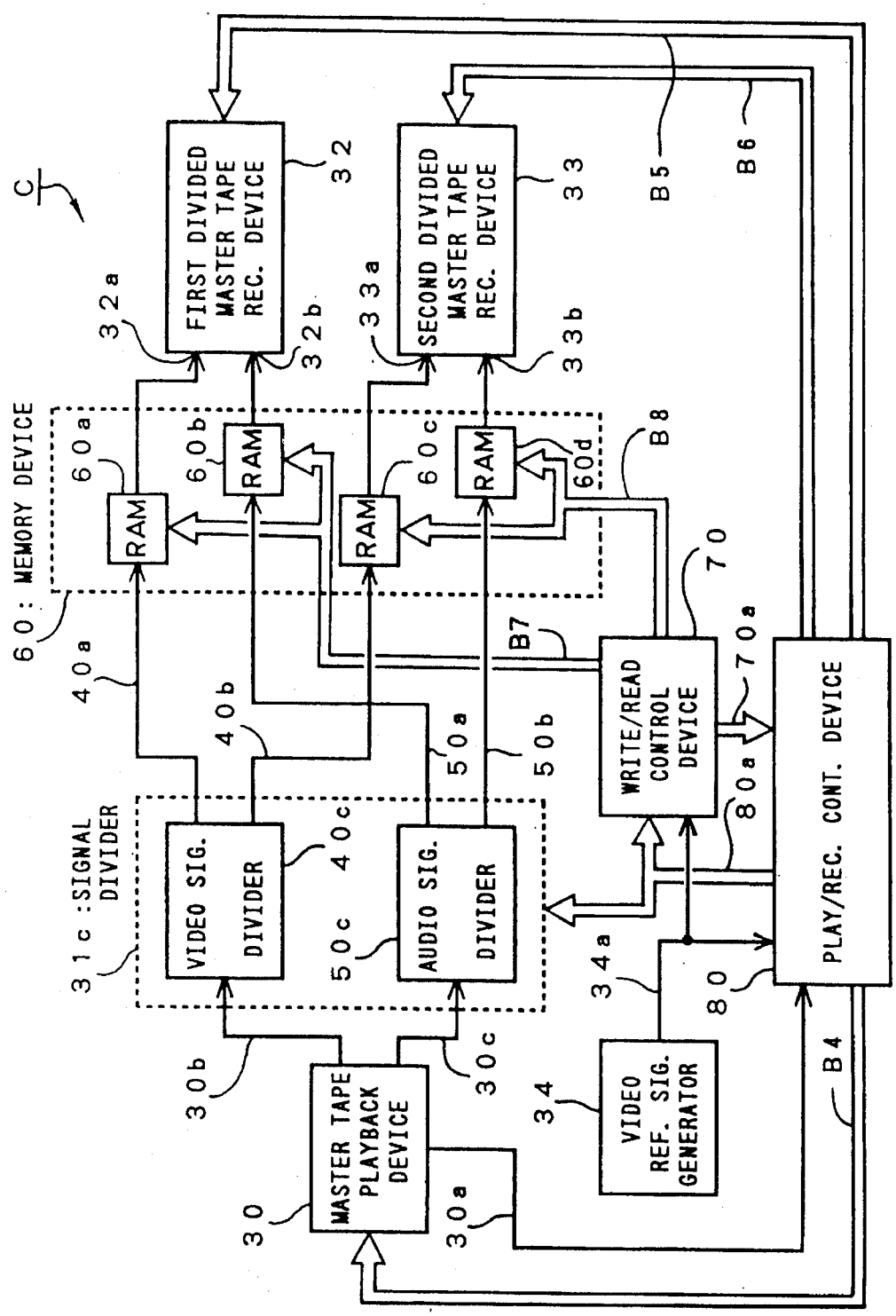
FIG. 6 is a block diagram of a divided master tape producing apparatus according to a further embodiment of the present invention.

FIG. 6 is a block diagram of another embodiment of the divided master tape producing device according to the present invention.

The divided master tape producing device "C" comprises a memory device 60 for temporarily storing video signals 40a and 40b and audio signals 50a and 50b of respective time-division signals from a signal divider 31C, a write/read control device 70 for control ling write and read operations with respect to the memory device 60 and a playback/recording control device 80 associated with the write/read control device 70 for controlling operations of the master tape playback device 30 and the respective master tape recording devices 32 and 33.

The memory device 60 comprises a plurality of RAMs (random access memories) 60a, 60b, 60c and 60d. The respective RAMs 60a–60d are 2-port memories each having a write port and a read port.

The write/read control device 70 responds to a video reference signal from a video reference signal generator 34 to control the write/read operations.

The write/read control device 70 switches a write operation, through RAM control buses B7 and B8, to either a first series RAMs 60a and 60b or a second series RAMs 60c and 60d, according to a series select instruction 80a given by the playback/recording control device 80.

The write/read control device 70 starts reading continuously, with a phase shifted from the write timing, the data stored up to the moment when a total data amount written in the respective RAMs 60a–60d reaches a preset amount, and concurrently sends a read start instruction 70a to the playback/recording control device 80.

The playback/recording control device 80 responds to the read start instruction 70a to send, through the recording device control buses B5 and B6, an instruction for turning the first and second divided master tape recording devices 32 and 33 into a recording mode.

It should be noted that the write/read control device 70 may be constituted as such that it sends a pause instruction to the playback/reproducing control device 80 to temporarily stop a reproducing operation of the master tape playback device 30, when the respective RAMs 60a–60d are completed to be written with a predetermined amount of data, and during this stop period, the write/read control device 70 reads the contents of the RAMs 60a–60d simultaneously and to turn the first and second divided master tape recording devices 32 and 33 into a recording mode through the playback/recording control device 80.

As mentioned above, since the divided master tape producing device "C" according to the present invention is constructed so that, after storing the two divided master signals in the storage device 60, it supplies these signals to corresponding divided master tape recording devices 32 and 33 continuously, it is possible to prolong the time for intermittent recording operation of the first and second divided master tape recording devices 32 and 33, causing a recording to be more stable.

Figure 7:
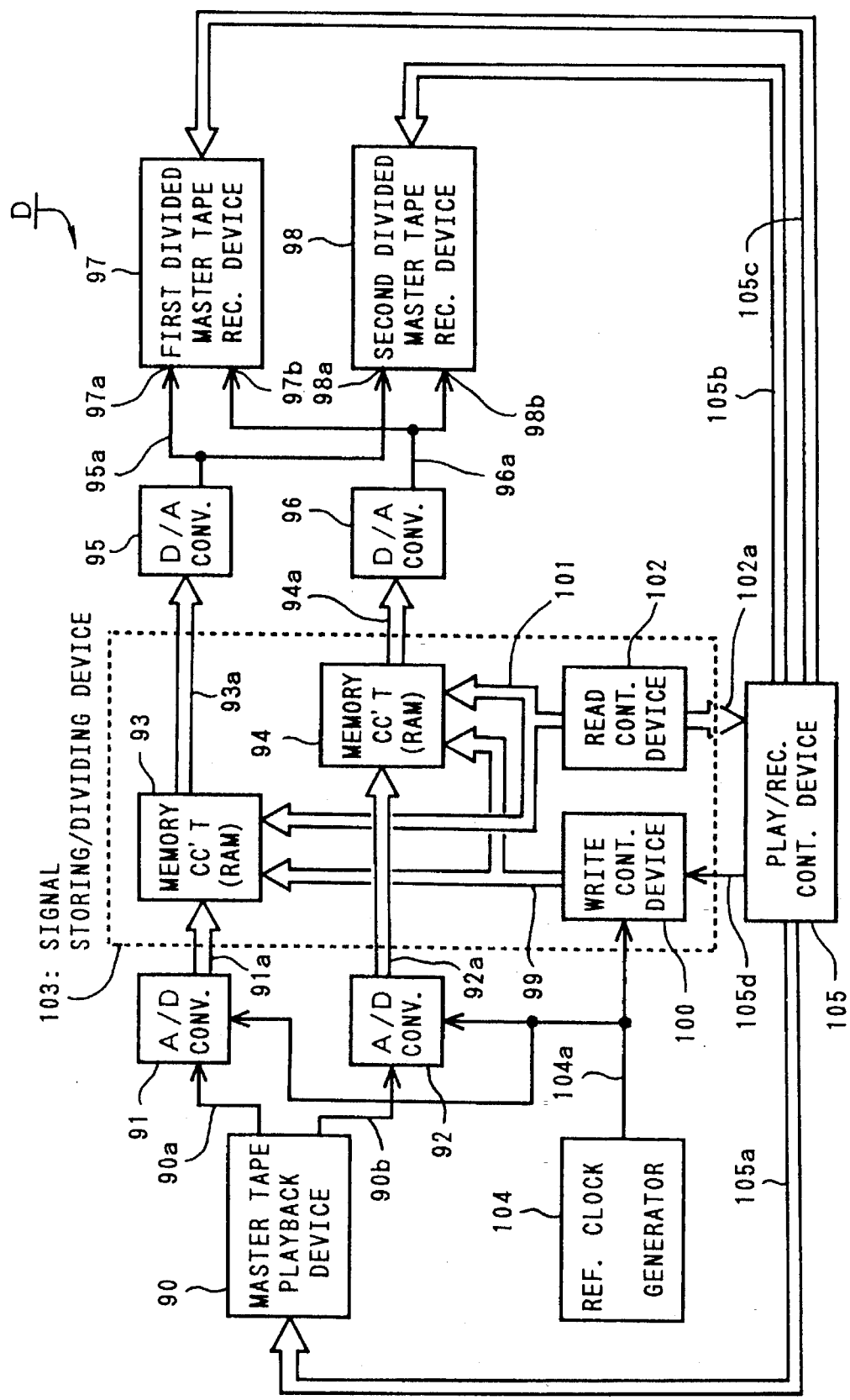
FIG. 7 is a block diagram of a divided master tape producing apparatus according to a still further embodiment of the present invention.

FIG. 7 shows a block diagram of a further embodiment of the divided master tape producing apparatus according to the present invention.

The divided master tape producing apparatus "D" shown in FIG. 7 comprises A/D converters 91 and 92 for converting an analog video signal 90a and an analog audio signal 90b outputted from a master tape playback device 90 into digital signals, respectively, memory circuits 93 and 94 for storing an A/D converted video signal 91a and an audio signal 92b and D/A converters 95 and 96 for converting the digital video and audio signals 93a and 94a read out from the memory circuits 93 and 94 into analog signals, respectively.

When the master tape "M" and first and second divided master tape recording devices 97 and 98 are of digital type, respectively, the A/D converters 91 and 92 and the D/A converters 95 and 96 may be omitted.

A divided video signal 95a from the D/A converter 95 for video signal is supplied to video signal input terminals 97a and 98a of the first and second divided master tape recording devices 97 and 98 signal paths thereto are regarded as first and second channels.

A divided audio signal 96a from the D/A converter 96 for audio signal is supplied to audio signal recording input terminals 97b and 98b of the respective divided master tape recording devices 97 and 98.

The respective memory circuits 93 and 94 are constituted with 2-port RAMs each having a write port and a read port.

The digital signals 91a and 92a from the A/D converters 91 and 92 are written in the memory circuits 93 and 94 according to a write address and write timing signals supplied from a write control device 100 through a write control bus 99 and the stored signals are read out therefrom according to a read address and read timing signals, etc., supplied from a read control device 102 through a read control bus 101.

The memory circuits 93 and 94 and the write and read control devices 100 and 102 constitute a signal storing/dividing device 103 which produces two divided master signals divided at a predetermined time interval by temporarily storing the divided signals and changing reading order of the divided signals thereafter.

A reference clock generator 104 produces a timing signal 104a which provides references for sampling period of the A/D converter and a write timing.

A playback/recording control device 105 controls a reproducing operation of the master tape playback device 90 and recording operations of the first and second divided master tape recording devices 97 and 98.

The playback/recording control device 105 controls start, stop and reproducing speed of the master tape playback device 90 through a playback control bus 105a and controls start, stop, recording speed and recording position of the tapes of the first and second divided master tape recording devices 97 and 98 through similar recording control buses 105b and 105c.

The playback/recording control device 105 turns the master tape reproducing device 90 into a playback state and simultaneously supplies a writing start instruction 105d to the control device 100 for causing the memory circuits 93 and 94 to start writing.

The read control device 102 sends a recording instruction 102a to the playback/recording device 105 at a time when a series of write operations completes or digital signal data has been written in substantially a half of a whole memory area by the series of write operations. The recording instruction signal 102a contains an information indicative of whether a signal to be read belongs to the first channel or the second channel mentioned before and the playback/recording control device 105 turns the assigned first or second divided master tape recording device 97 or 98 into recording state.

The read control device 102, when the recording instruction 102a is outputted, reads the respective memory circuits 93 and 94. This reading is performed as such that a signal which is continuous in time is divided into two series signals at a predetermined time interval. For example, after the recording instruction 102a is sent to the first divided master tape recording device 97, data corresponding to a period of 0–10 seconds of the master tape playback time is read out and then data of 20–30 seconds is read out, and, so on. Then, after the device 98 is selected in response to the recording instruction 102a forwarded to the device 98, data of 10–20 and 30–40 seconds and so on are read out.

In the divided master tape producing apparatus "D" according to the present invention, the time divisional signal division is performed by changing the sequence of reading signals stored in the memory circuits 93 and 94 then the read out signals are recorded in the corresponding first and second divided master tape recording devices 97 and 98, accordingly, the divided master tapes are produced efficiently. Although, in this embodiment, the signal is divided by changing addresses at the reading of the memory circuits 93 and 94, it is possible to constitute a system as such that signals in the respective channels are read out continuously by changing addresses at the time of writing.

Although it is possible to temporarily suspend the playback of the original master tape at a time when the writing to the whole areas of the memory circuits 93 and 94 completes, a new signal may be written in an address the content of which has been read out without suspending the reproduction of the original master tape, by suitably setting a time difference between the write and the read according to capacities of the memory circuits 93 and 94.

For the intermittent driving of the first and second divided master tape recording devices 97 and 98, the playback/recording control device 105 may be constructed as such that the recording position is exactly controlled by rewinding a predetermined amount of the tape right after the recording is stopped, starting the tape running at a time when the recording instruction 102a is supplied from the read control device 102, returning a read enable signal at a predetermined timing by monitoring a tape running control signal prerecorded on the divided master tape, and start reading of the memory circuits 93 and 94 in response to the read enable signal.

Figure 8:
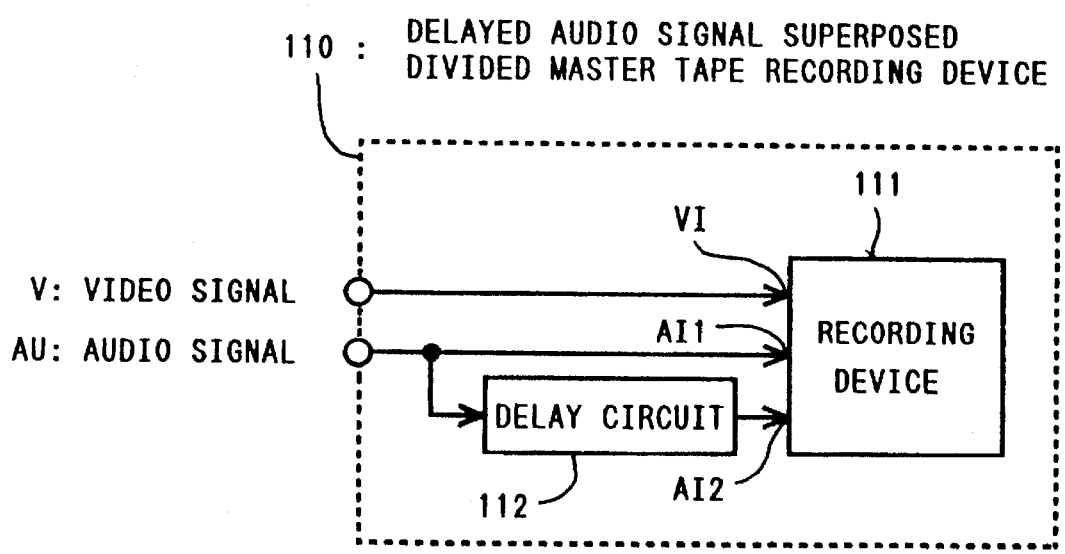
FIG. 8 is a block diagram of a recording device for producing a delayed audio-signal-superposed divided master tape, according to an embodiment of the present invention.

FIG. 8 is a block circuit diagram of a recording device for producing a delayed audio signal superposed divided master tape according to the present invention.

A delayed audio signal superposed divided master tape recording device 110 is a modified version of the first and second divided master tape recording devices 32, 33, 97 or 98 shown in FIGS. 5–7 with portions thereof modified. The delayed audio signal superposed/divided master tape recording device 110 comprises a recording device 111 having 2 separate audio signal recording input terminals AI1 and AI2 and a delay circuit 112.

A video signal "V" is supplied to a video signal recording input terminal VI of the recording device 111, an audio signal "AU" is supplied to the recording device 111 to its audio input terminal AI1 directly and to its audio input terminal AI2 through the delay circuit 112, respectively.

Accordingly, two kinds of audio signals are recorded on a divided master tape by using this divided master tape recording device 110, one being with a delay and the other without the delay.

Figure 9:
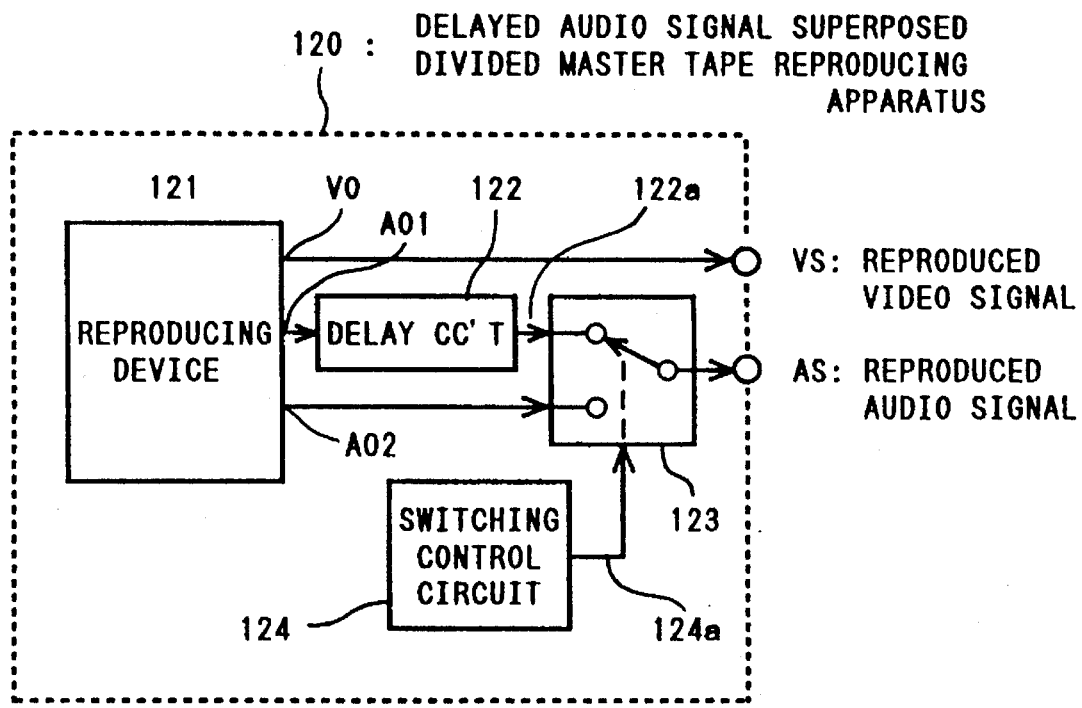
FIG. 9 is a block diagram of a playback device for playing back a delayed audio-signal-superposed divided master tape, according to another embodiment of the present invention.

FIG. 9 is a block diagram of a delayed audio signal superposed and divided master tape reproducing apparatus according to the present invention.

The delayed audio signal superposed and divided master tape reproducing apparatus 120 shown in FIG. 9 has a similar construction to that shown in FIG. 1, with some modifications of the first and second divided master tape reproducing devices 1 and 2.

The delayed audio signal superposed and divided master tape reproducing apparatus 120 comprises a reproducing, device 121 having two channel signal reproducing output terminals A01 and A02, a delay circuit 122 for delaying an audio signal reproduced without delay and supplied from the output terminal A01, a switching circuit 123 for switching between an audio signal 122a delayed by the delay circuit 122 and an audio signal recorded with delay and supplied from the output terminal A02 and a switching control circuit 124 for controlling a switching operation of the switching circuit 123.

A delay time of this delay circuit 122 is same as that of the delay circuit 112 provided within the delayed audio signal superposed and divided master tape reproducing apparatus 110.

A reproduced video signal VS from the video signal output terminal VO is supplied directly to the double speed recording signal producing device 3 shown in FIG. 1 and the reproduced audio signal AS from the switching circuit 123 is supplied to the device 3.

The switching control circuit 124 controls the switching between two kinds of audio signal by supplying a switching control signal 124a to the switching circuit 123 at a preset timing so as not cause a loss of audio signal in the fade-in and fade-out switching process discussed later.

The switching timing is selected such that it is synchronous with an editing interval during production of the divided master tapes.

In a case where the divided master tapes carry control signals related to tape running positions, the apparatus may be constituted as such that it determines editing positions according to the control signal, to produce the switching control signal 124a.

FIG. 10(a)–(h) shows a series of time chart of an operation of the audio signal switching circuit.

FIG. 10(a) illustrates a signal processing operation of fade-in and fade-out at the editing points.

FIG. 10(b) shows an audio signal to be recorded on the audio signal superposed and divided master tape, where the audio signal is not delayed, and FIG. 10(c) shows another audio signal to be recorded on the audio signal superposed and divided master tape, where above another audio signal is delayed by the delay circuit 112, and Td is a delay time of the delay circuit.

FIGS. 10(d) and 10(e) show reproduced audio signals obtained at the output terminals A01 and A02 of the reproducing apparatus 121 and FIG. 10(f) shows the signal 122a delayed by the delay circuit 122.

FIG. 10(g) illustrates the switching control signal 124a for selecting either one of the signals shown in FIGS. 10(e) and 10(f) as the audio signal output AS and FIG. 10(h) shows the audio signal output AS composed by the switching.

It is possible to obtain a continuous audio signal having no loss by delaying, when reproduced, the audio signal which was recorded without delay to coincide it with the audio signal recorded with delay as shown in FIGS. 10 (e) and ks10(f), and switching between them by the switching circuit 123 as such that the fade-in and fade-out portions thereof are excluded.

Similarly, it is possible to reproduce an audio multiplexed stereo signal etc., when the divided master recording device and the reproducing device respectively have 4 channels or more.

Although the embodiments have been described for dubbing at a double speed, the dubbing speed can be three or more times by increasing the number of the divided master tape recording devices and the divided master tape reproducing devices and changing the dividing number of a master signal.

Further, in the described embodiments, the signal is divided and combined every color frame, but it is possible to convert the bit rate every segment, every field, every frame or every two frames.

Since the dubbing apparatus according to the present invention is equipped with the N (times) speed recording signal producing device in which reproduced signals in N channels are time compressed to 1/N, respectively, and sequences of the respective signals are restored to be same as that of the original master signal, it is possible to perform a dubbing at the N times speed by using N times speed recording devices.

Further, since the divided master tape producing apparatus according to the present invention divides a reproduced signal from an original master tape at a predetermined time interval and supplies them to the respective master tape recording devices, it is possible to produce a plurality of divided master tapes by a single reproducing operation.

Further, since the divided master tape producing apparatus stores signals divided into N channels in memory devices and then continuously reads them out and supplies them to corresponding divided master tape recording devices, it is possible to prolong the time of intermittent recording operation of the divided master tape recording device and record signals with improved stability.

Further, since the divided master tape producing apparatus according to the present invention stores the reproduced original master signal of the master tape temporarily in a memory circuit and then reads and records it by corresponding divided master tape recording devices, it is possible to produce the divided master tapes efficiently.

Further, since the dubbing apparatus according to the present invention delays the signal, which is originally recorded on a tape without delay, by a delay circuit to remove a time difference from the signal recorded with delay and selects portions of audio signal which are not subjected to fade-in and fade-out process, it is possible to obtain a continuous audio signal even when a device which performs fade-in and fade-out processings of audio signal at editing points, is used.

What is claimed is:

1. A divided master tape producing apparatus comprising:

an original master tape playback device for playing back an original master tape recorded with an original master signal having an original signal sequence;

signal dividing means for dividing said original master signal time-divisionally into predetermined signal segments of equal length, each of said predetermined signal segments having a preselected time code and being one of a group consisting of one video field, one video frame, one color frame and two video frames forming an N number of divided master signals by assigning said predetermined signal segments sequentially and cyclically between said N number of divided master signals based on said time code where N is greater than 1, said signal dividing means comprising means for storing contents of said original master signal reproduced from said original master tape playback device and controlling means for controlling said storing means so as to produce said N number of divided master signals being outputted from said storing means; and N number of master signal recording devices for recording said N number of divided master signals respectively on N number of master tapes, said controlling means causing said N number of master signal recording devices to drive intermittently said N number of master tapes to be recorded, so that each of said N number of divided master signals becomes continuous without time interruption on said N number of tapes.

2. A dubbing apparatus comprising:

an original master tape playback device for playing back an original master tape recorded with an original master signal having an original signal sequence;

signal dividing means for dividing said original master signal time-divisionally into predetermined signal segments of equal length, said signal segments of equal length each having a preselected time code thereby forming an N number of divided master signals by assigning said predetermined signal segments sequentially and cyclically between said N number of divided master signals based on said time code where N is an integer greater than 1;

N number of master signal recording devices for recording said N number of divided master signals respectively on N number of master tapes, control means for causing said N number of master signal recording devices to drive intermittently said N number of master tapes to be recorded, so that each of said N number of divided master signals becomes continuous without time interruption on said N number of master tapes;

N number of master tape playback devices for synchronously and simultaneously playing back at a real time speed said N number of master tapes respectively;

N-times speed recording signal producing means for time-compressing each of said N number of divided master signals reproduced from said N number of master tape playback devices into 1/N to obtain N-times speed recording signals while restoring said original signal sequence in each of said N-times speed recording signals; and recording means for recording said N-times speed recording signals on a plurality of slave tapes each running at a speed which is N-times a normal playback speed of said slave tapes.

3. A dubbing apparatus claimed in claim 2, wherein said signal dividing means comprises memory means for storing said N number of divided master signals and means for supplying said N number of divided master signals stored in said memory means to said N number of master signal recording devices.

4. A dubbing apparatus claimed in claim 2, wherein said signal dividing means comprises means for storing contents of said original master signal reproduced from said original master tape playback device and means for controlling said storing means so as to produce said N number of divided master signals being outputted from said storing means and to supply said N number of divided master signals to said N number of master signal recording devices.

5. A dubbing apparatus as claimed in claim 2, wherein said original master signal includes an original audio signal and each of said N number of master tapes is recorded with a first audio signal having a predetermined delay time, and a second audio signal having no delay, said first and second audio signals are derived from said original audio signal, and each of said first and second audio signal has fade-in and fade-out editing points, said dubbing apparatus further comprises a delay circuit for delaying said second audio signal reproduced from a corresponding one of said N number of master tape playback devices, and audio signal switching means for selectively outputting one of said first audio signal and said second audio signal delayed by said delay circuit, so that said one of the first and second audio signals selected by said audio signal switching means for outputting, does not contain said fade-in and fade-out editing points.

6. A dubbing apparatus claimed in claim 2, wherein said original master signal is in an analog signal and said signal dividing means comprises an analog to digital conversion means for converting said original master signal into a digital format to produce said N number of divided master signals.

7. A dubbing apparatus claimed in claim 2, wherein said N number of master signal recording devices are digital devices.

8. A dubbing apparatus claimed in claim 2, wherein said N number of divided master signals respectively recorded on N number of master tapes are in a digital format, said N-times speed recording signal producing means comprises bit rate converters with memory means and said N number of divided master signals in the digital format are written in and read out from said memory means for producing said N-times speed recording signals.

9. A dubbing apparatus claimed in claim 2, wherein said N number of master tape playback devices play back said N number of master tapes synchronously and simultaneously and are controlled by a timing signal supplied thereto.

10. A dubbing apparatus as claimed in claim 2, wherein said equal length is a length of one of a group consisting of one video field, one video frame, one color frame and two video frames of said original master signal.

11. A dubbing apparatus claimed in claim 2, wherein N is 2 and said original master signal is time-divisionally divided into odd numbered color frames and even numbered color frames.

\* \* \* \* \*

UNITED STATES PATENT AND TRADEMARK OFFICE
CERTIFICATE OF CORRECTION

PATENT NO. : 5,481,411
DATED : January 2, 1996
INVENTOR(S) : Nakatani, Yoichiro

It is certified that error appears in the above-indentified patent and that said Letters Patent is hereby corrected as shown below:

Column 14,

Claim 5, line 2, after "audio signal", insert
--having fade-in and fade-out editing points--
lines 6-8, cancel "and each of said first and second audio signal has fade-in and fade-out editing points,"
line 16, change "said fade-in and fade-out editing points " to
--an editing point of said original audio signal--.

Signed and Sealed this

Fourth Day of March, 1997

Attest:

BRUCE LEHMAN

Attesting Officer

Commissioner of Patents and Trademarks